United States Patent [19]

Ditzel et al.

[11] 4,108,024
[45] Aug. 22, 1978

[54] INDEXING DEVICES

[76] Inventors: Heinz Ditzel; Werner Ditzel, both of Hainstrasse 27-29, 6369 Schoneck 1, Germany

[21] Appl. No.: 628,649

[22] Filed: Nov. 4, 1975

[30] Foreign Application Priority Data

Nov. 5, 1974 [DE] Fed. Rep. of Germany ....... 2452340
May 6, 1975 [DE] Fed. Rep. of Germany ....... 2520022

[51] Int. Cl.$^2$ .................. B23B 29/24; B23Q 17/00
[52] U.S. Cl. .................................. 74/813 L; 74/815; 408/89
[58] Field of Search ............... 74/826, 813 C, 813 L, 74/813 R, 816, 818, 817, 815; 408/89; 33/174 TD, 10

[56] References Cited

U.S. PATENT DOCUMENTS

| | | | |
|---|---|---|---|
| 1,946,835 | 2/1934 | Buhr | 74/813 X |
| 1,956,883 | 5/1934 | Verderber | 74/813 X |
| 2,610,552 | 9/1952 | Victory | 74/813 X |
| 2,679,787 | 6/1954 | Froehlich | 74/818 |
| 2,787,175 | 4/1957 | Schurger | 74/813 L |
| 2,921,487 | 1/1960 | Schabot | 74/826 X |
| 3,031,902 | 5/1962 | Parske et al. | 74/813 LC |
| 3,091,135 | 5/1963 | Thompson | 74/826 |
| 3,474,691 | 10/1969 | Levin et al. | 408/89 X |

FOREIGN PATENT DOCUMENTS 1,085,010 7/1960 Fed. Rep. of Germany ............ 408/89

Primary Examiner—Francis S. Husar
Assistant Examiner—William R. Briggs
Attorney, Agent, or Firm—Haseltine, Lake & Waters

[57] ABSTRACT

An indexing head has a plurality of co-axial discs rotatable relative to each other. A first disc carries an indexing pin receivable in a series of equi-angularly spaced recesses of a second disc. A third disc is angularly settable relative to the second disc by means of gauge blocks, and is lockable after setting by locking means. A tool shank can be releasably held in an axial bore of the first disc. When used in an oil bath of an erosion machine, the head is fitted with a bellows skirt to prevent the oil reaching the discs.

1 Claim, 6 Drawing Figures

INDEXING DEVICES

BACKGROUND OF THE INVENTION

1. Field of the Invention

This invention relates to indexing heads for use with machine tools, for example, erosion machines and fine grinders, and horizontal jig boring mills, in, for instance, the supermachining of workpieces.

2. Description of the Prior Art

There are known many indexing heads received by the spindle and carrying the tool, for the adjustment on all sides of workpieces on machine tools. As a rule, the known indexing heads have a graduation at a peripheral surface of a rotatable disc, and a counter-marking associated with a stationary disc, there being also optionally provided a so-called Vernier scale for fine setting. Such a form of graduation is, even in combination with a Vernier scale, no longer adequate for the accuracies required at the present time, in many cases the degree of accuracy required being to arc minutes and seconds.

Indexing heads are known from U.S. Pat Nos. 3,049,032, 2,177,006 and 2,342,539, Swiss Pat. No. 542,687 and German Offenlegungsschriften Nos. 2,109,270 and 1,427,085. These known heads have the defect of extremely inconvenient construction, and they afford only relatively coarse setting or the setting or adjusting means are inconvenient to manipulate.

SUMMARY OF THE INVENTION

The present invention provides an indexing device comprising first, second and third discs substantially co-axial with one another, first and second engagement means of said first and second discs, respectively, inter-engageable to latch releasably said first and second discs in any selected one of a number of relative angular positions thereof, gauge means, respective abutment surfaces of the second and third discs, whereby said second and third discs can be angularly positioned relatively to each other by turning the second and third discs relatively to each other, with said gauge means disposed between said abutment surfaces, until said gauge means abuts both of said abutment surfaces; and clamping means including a clamping member movable in an axial direction of the discs to clamp said second and third discs against turning relatively to each other.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENT

Figure 1:
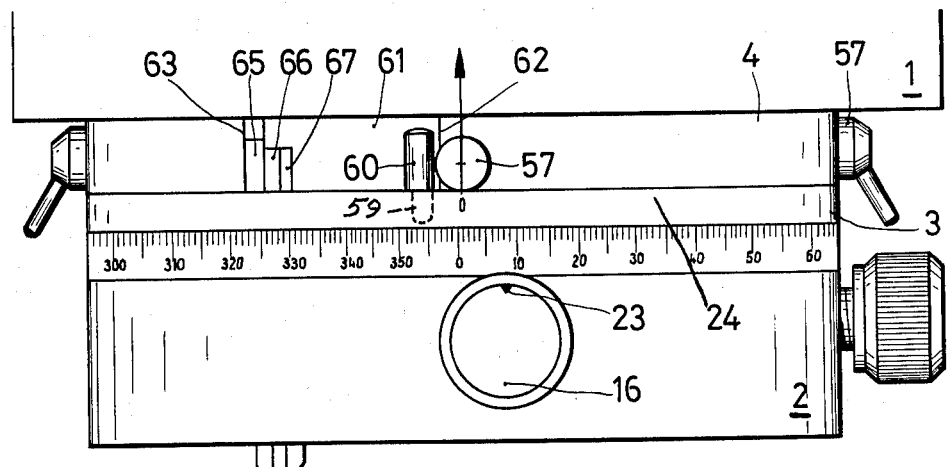
FIG. 1 shows an elevation of an indexing head.
Figure 2:
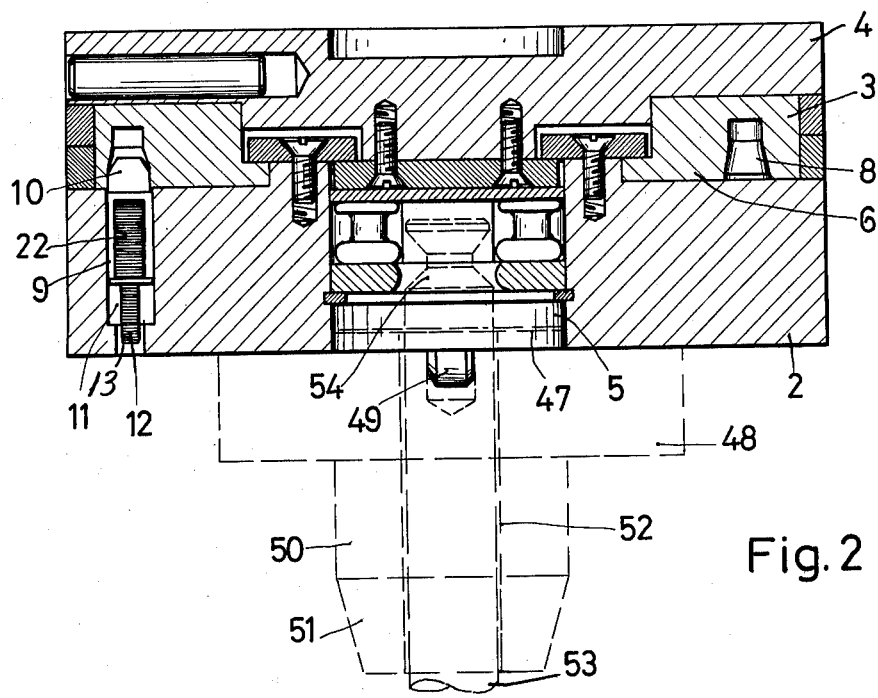
FIGS. 2 and 3 show respective axial sections of the head.
Figure 3:
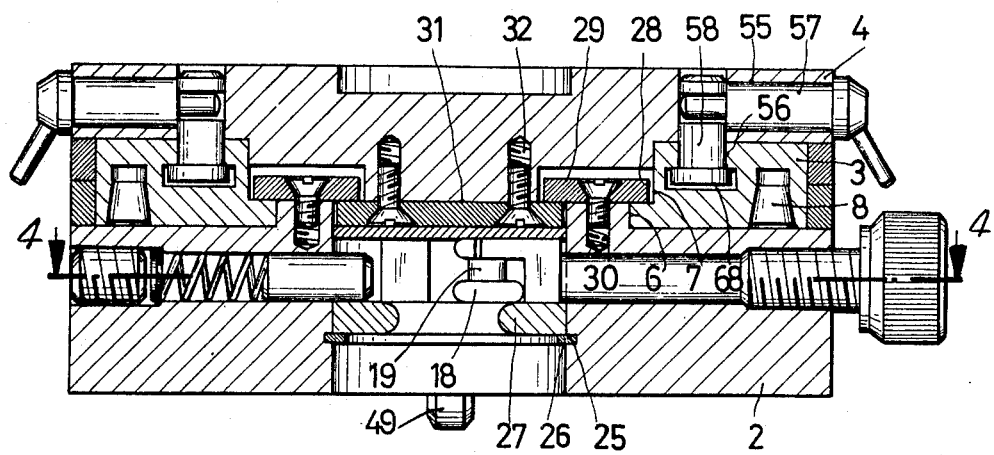
Figure 4:
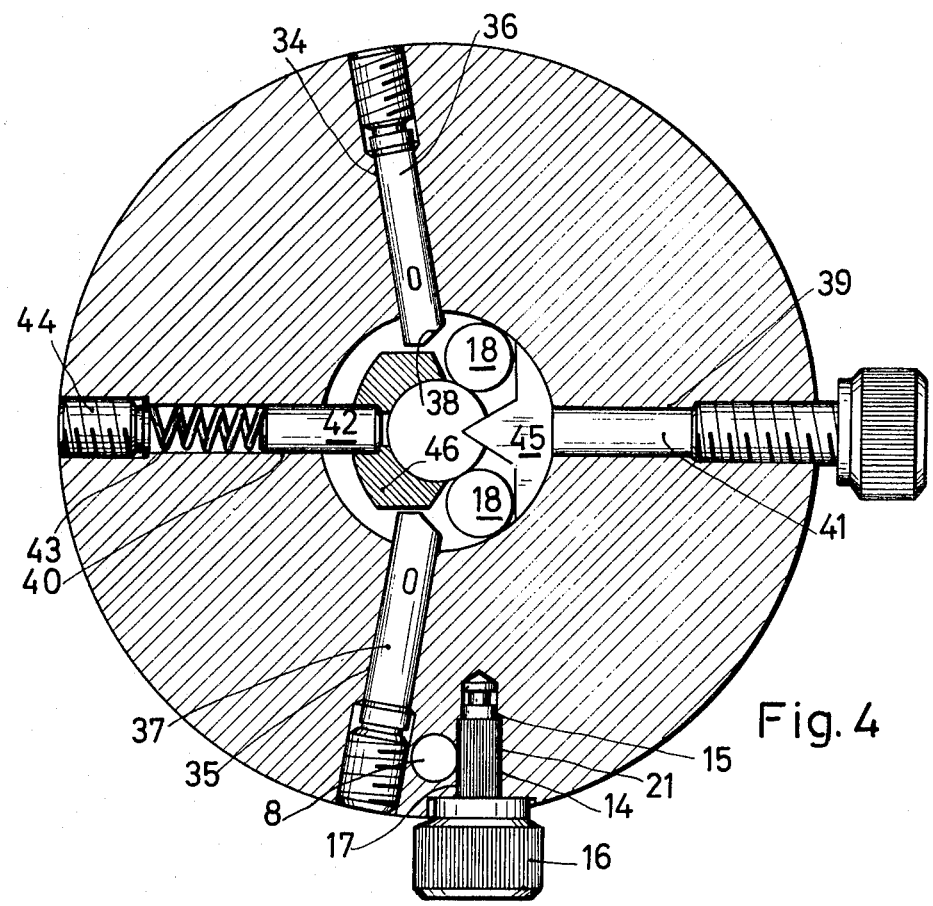
FIG. 4 shows a cross-section of the head taken along the line 4—4 of FIG. 3.

Referring to FIGS. 1–4, there are secured to a spindle 1 three discs 2, 3 and 4 disposed concentrically one above the other. The discs 2 and 3 are formed with respective axial bores 5 and 6. The disc 3, which is disposed between the discs 2 and 4, is formed, at a spacing inwardly of a peripheral face 24 thereof, with axis-parallel bores 8, providing a series of equi-angularly spaced recesses, positioned on a pitch circle, the spacing between the bores 8 being 15°. Associated with these bores 8, in an axis-parallel bore 9 in the outer disc 2, is a displaceable indexing pin 10. Associated with the indexing pin 10 is a coil spring 12 received in a blind bore 11. The coil spring 12 bears at the free end on a plug 13 sealing the bore 9.

The indexing pin 10 is so dimensioned that, in a basic position, it projects into one of the bores 8, thereby coupling the two discs 2 and 3 with each other. Associated with the pin 10 is a displaceably guided adjusting pin 15 having a knurled head 16 and a shank 17 received in a transverse bore 14 of the disc 2. The shank 17 has toothing 21 meshing with a toothed strip 22 on the indexing pin 10. Provided between the head 16 of the adjusting pin 15 and the peripheral face 24 of the disc 2 is reference marking means 23 indicating the basic position between the knurled head 16 and the disc 2.

After displacing the indexing pin 10 against the action of the spring 12, the disc 2 can be rotated relative to the disc 3, whereupon, after release of the adjusting pin 15, the indexing pin 10 snaps, after rotation of the disc 2 relative to the disc 3 through 15°, into a next bore 8. At the peripheral faces of each of the discs 2 and 3 there is provided marking means indicating the positions of the discs 2 and 3 relative to each other.

The axial bore 5 formed in the disc 2 has an annular groove 25 in which is received a snap ring 26 serving to retain an annular bearing member 27. The axial bore 6 formed in the disc 3 includes a portion of enlarged diameter 7. On a shoulder 28 formed thereby there is disposed a clamping member in the form of an intermediate ring 29 which is secured to the disc 2 by screws 30. As can be seen from FIG. 3, the axial bore 6 formed in the disc 3 is larger than the axial bore 5 formed in the disc 2. Disposed under the ring 29 is a disc 31 the diameter of which is intermediate the inner and outer diameters of the ring 29, and which is secured to the disc 4 by screws 32. Between the bearing member 27 and the disc 31 there are guided for transverse movement two engagement members comprising flat discs 18 having on one side a cylindrical attachment 19 whereby the engagement members are in contact both with the member 27 and the disc 31.

The disc 2 is formed with two transverse bores 34 and 35 the axes of which include an angle of approximately 160°, the bores receiving plugs 36 and 37 respectively. The plugs 36 and 37 are formed at the inner ends thereof with oblique contact or clamping faces 38 disposed in the axial bore 5 formed in the disc 2. The plugs 36 and 37 are adapted to be adjusted in and locked in the disc 2 and are located at the level of the discs 18, to which the faces 38 are opposed. The disc 2 is formed, at the same level as the bores 34 and 35, with two further transverse bores 39 and 40 which are located diametrically opposite each other and symmetrically of the bores 34 and 35. The bores 39 and 40 receive plugs 41 and 42 respectively. The plug 42 is loaded at the outer side by resilient urging means in the form of a coil spring 43 guided in the bore 40. The outer end of the bore 39 is sealed by a plug 44. The plug 41 is guided for displacement lengthwise of the bore 39. Mounted forwardly of the plug 41, and in the axial bore 5, is a sectorial mover member 45 provided with a forwardly projecting nose 64 and which abuts the two discs 18. Connected forwardly of the plug 42, and in the axial bore 5, is a sectorial urging member 46 for co-operation with the discs 18. By tightening the spring 43, the urging member 46 can be displaced in the axial bore 5 towards the two discs 18, whereby the discs 18 are lifted out of a v-section annular groove 54 formed in a tool shank 53.

Inserted into the axial bore 5 of the outer disc 2 is an annular collar 47 of a guide attachment 48. The attachment 48 is located relative to the disc 2 by an indexing pin 49. The attachment 48 also comprises a cylindrical portion 50 having a conical face 51. The attachment 48 is formed with an axial bore 52 for guiding the tool shank 53. On tightening the spring 43 and on the displacement, accompanying such tightening, of the discs 18 relative to each other, the latter are advanced towards the groove 54 of the tool shank 53. The tool shank 53 is thereby pulled through the disc 2 and aligned on the disc 31.

The disc 4 adjacent the spindle 1 is formed with a plurality of radially inwardly extending blind passages 55 which are distributed around the periphery of the disc 4, and from the inner end of each of which there extends an axis-parallel branch passage 56 extending in the disc 3. Each of the passages 55 receives a turnable push-in pin 57 provided with an eccentric portion and projecting as far as the branch bore 56. Disposed in each branch bore 56 is a headed pin 58 the head of which is guided in an associated arcuate T-slot 68 formed in the disc 3.

The arcuate slots 68 are so dimensioned that they permit rotation of the discs 3 and 4 relative to each other through at least 20°. By turning the eccentric pins 57, the eccentric portions of which are received in transverse bores of the associated pins 58, the pins 58 are moved lengthwise of the passages 56, and so the two discs 3 and 4 can be clamped relative to each other, and thus locked against relative rotation.

In an axis-parallel bore 59 located between the bores 8, the disc 3 receives an abutment member in the form of a pin 60 projecting into a recess 61 formed in the disc 3 at the periphery thereof. End faces 62 and 63 of the recess 61 are aligned in accordance with radii of the disc 3 and include an angle of at least 20°. The face 63 is undercut at 78, a gauge block stop 65 being inserted into the undercut. Prior to commencing a working step, gauge blocks 66 and 67, as required in each particular instance, are inserted into the recess 61 forwardly of the gauge block stop 65, and the two discs 3 and 4 are sufficiently rotated relative to each other to produce the result that the gauge blocks 66 and 67 are clamped between the gauge block stop 65 and the pin 60. Then, by turning the pins 57, the discs 3 and 4 are clamped to each other.

Owing to the spacing of the apertures 8, the discs 2 and 3 are rotated relative to each other in 15° steps to provide an initial setting of the indexing head. After such initial setting, with the pins 57 released and with the insertion of the requisite gauge blocks 66 and 67, the discs 3 and 4 are rotated relative to each other until the gauge blocks are firmly clamped between the gauge block stop 65 and the pin 60. Thereby, no further fine adjustment or setting of the three discs 2–4 is required, since the gauge blocks permit superfine adjustment of the discs relative to each other down to seconds of arc.

Thus any graduation by means of Vernier scales on the peripheral faces of the individual discs becomes superfluous and read-off errors are avoided, since the exact angular positioning of the discs relative to each other is determined by the gauge blocks.

The indexing head is releasably secured in known manner at the spindle 1.

Figure 5:
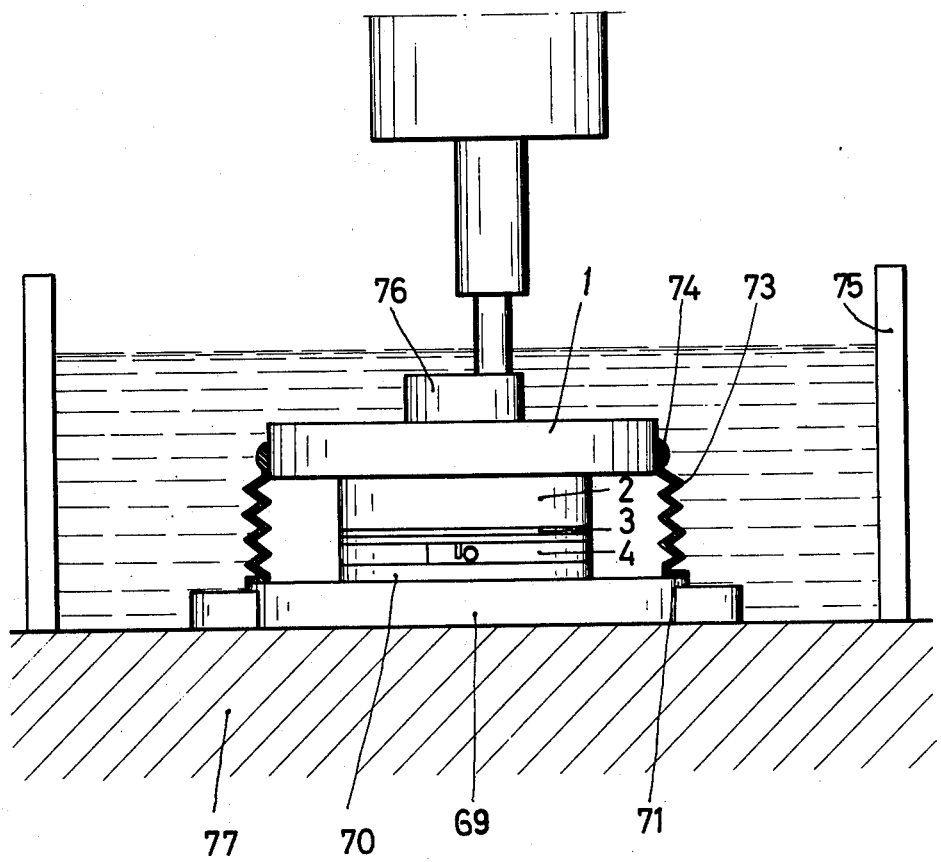
FIG. 5 shows an elevation illustrating the utilisation of the indexing head on an erosion machine.
Figure 6:
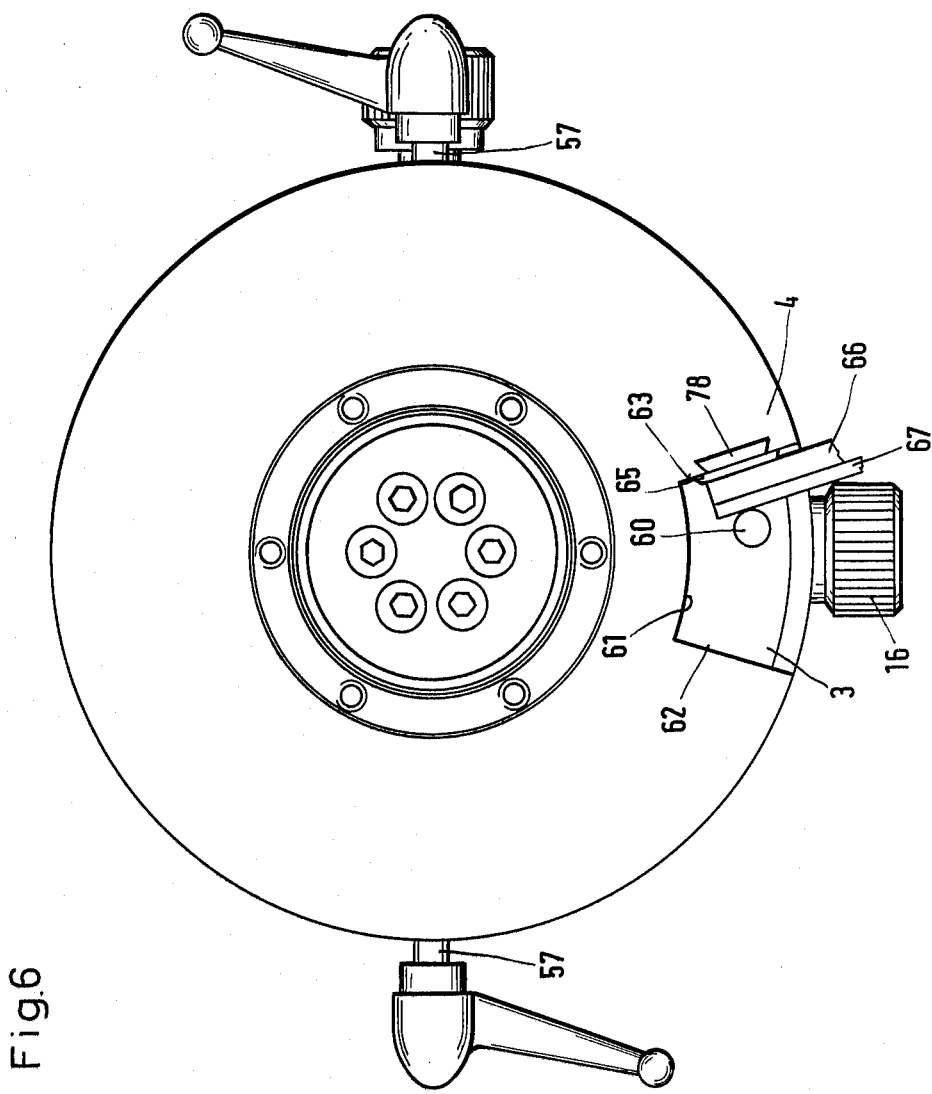
FIG. 6 is a top elevational view of the indexing head.

Referring now to FIG. 5, there is releasably secured on a machine table 77 of an erosion machine, with interpositioning of a base plate 69 having an attachment plate 70, the above-described indexing head comprising the three discs 2, 3 and 4. The indexing head carries above it the spindle 1 and at the periphery thereof a bellows-form skirt 73, of oil-resisting material, is secured in fluid-tight manner by means of a hose clip 74. The length of the extended bellows skirt 73 is such that its lower edge is somewhat below the indexing head. Disposed in fluid-tight manner on the machine table 77 is an oil bath 75 connected to a circulating pump (not shown) actuated from the machine drive (also not shown). The spindle 1 carries a workpiece 76. The oil level in the bath 75 is so selected that the workpiece 76 is completely immersed in the oil. Under the static pressure of the oil, the air enclosed by the bellows skirt 73 is slightly condensed, so that the oil level within the skirt 73 is located somewhat above the lower edge of the skirt 73, but the surface of the oil within the skirt 73 is below the indexing head.

Thus in simple manner oil and erosion particles are reliably kept away from the indexing head. The bellows skirt 73 is retained at the lower edge thereof by a magnetic seal ring 71 bearing on the upper face of the base plate 69, although optionally the ring 71 can be omitted.

We claim:

1. An indexing device comprising first, second and third discs substantially coaxial with one another, said first, second and third discs being rotatably mounted relative to each other; first and second engagement means formed of said first and second discs are releasably engageable to latch said first and second discs in any selected relative angular position; said second and third discs having respective abutment surfaces; gage means positioned between said abutment surfaces for angularly positioning said second and third discs relative to each other by turning each of said discs until said gage means abuts both of said abutment surfaces; clamping means including a clamping member movable in an axial direction of said discs for clamping said second and third discs against relative turning; said second disc having therein a first radially extending passage and said third disc having therein a second passage extending transversely to said first passage and communicating with the latter; said clamping means including a first pin with an eccentric portion, being positionable in said first passage; a second pin received in said second passage; and retaining means formed of said third disc arranged to engage said second pin for limiting movement of the latter lengthwise of said second passage, said eccentric portion engaging said second pin whereby turning of said first pin enables movement, said second pin extending lengthwise of said second passage into clamping engagement with said retaining means; said first and said second engagement means being defined by a series of parallel bores arranged in said first disc positioned at a predetermined angular spacing along a circle extending concentrically therewith, said second engagement means being in the form of an indexing pin arranged parallel in the second disc which indexing pin slides into any selected bore; said bores and indexing pin forming coarse preadjusting means to permit coarse adjustment of said first disc relative to said second disc and relative to said third disc clamped to said second disc; said second disc having an abutment surface in the form of a pin projecting from said disc, said pin coacting with said gage means associated wth said second and third discs, and said gage means being disposed at an angular spacing different than the predetermined angular spacing of said bores to thereby define fine adjusting means for adjusting said first disc clamped to said second disc, relative to said third disc engaged with said second disc after coarse adjustment of said first disc relative to said second disc.

* * * * *